United States Patent
Abukhovsky et al.

(10) Patent No.: US 10,628,590 B2
(45) Date of Patent: Apr. 21, 2020

(54) APPLICATION SECURITY ASSESSMENT

(71) Applicant: salesforce.com, inc., San Francisco, CA (US)

(72) Inventors: Maxim Abukhovsky, Hayward, CA (US); Bharath Kumar Pareek, Union City, CA (US); Jari Salomaa, San Francisco, CA (US); Amarjit Singh, Pittsburg, CA (US); Poorak Kashyap, San Francisco, CA (US); Pohsuen Kuo, San Francisco, CA (US); Prashanth Mahalingam Ganesan, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 222 days.

(21) Appl. No.: 15/413,751

(22) Filed: Jan. 24, 2017

(65) Prior Publication Data
US 2018/0211045 A1    Jul. 26, 2018

(51) Int. Cl.
*G06F 21/57* (2013.01)
*H04L 29/06* (2006.01)

(52) U.S. Cl.
CPC ...... *G06F 21/577* (2013.01); *G06F 2221/033* (2013.01); *H04L 67/42* (2013.01)

(58) Field of Classification Search
CPC ... G06F 21/577; G06F 2221/033; H04L 67/42
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

OTHER PUBLICATIONS

U.S. Appl. No. 13/986,251, filed Apr. 16, 2013.

*Primary Examiner* — Techane Gergiso
(74) *Attorney, Agent, or Firm* — Dergosits & Noah LLP; Todd A. Noah (57) ABSTRACT

Application security assessment is described. A system identifies a first security configuration and a second security configuration associated with an application. The system calculates a security score based on a comparison of the first security configuration to a first baseline security setting and a comparison of the second security configuration to a second baseline security setting. The system generates a security report associated with the application that includes the security score and outputs the security report.

20 Claims, 5 Drawing Sheets

(56) References Cited

U.S. PATENT DOCUMENTS

| | | | |
|---|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,984,644 B2 * | 3/2015 | Oliphant | G06F 21/554 726/22 |
| 9,998,480 B1 * | 6/2018 | Gates | H04L 63/1408 |
| 10,182,067 B2 * | 1/2019 | Zhou | G06F 11/3452 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0039046 A1 * | 2/2005 | Bardsley | G06F 21/552 726/4 |
| 2005/0050555 A1 | 3/2005 | Exley et al. |
| 2005/0091098 A1 | 4/2005 | Brodersen et al. |
| 2005/0246776 A1 * | 11/2005 | Chawro | G06F 21/577 726/23 |
| 2006/0026688 A1 * | 2/2006 | Shah | G06F 21/577 726/25 |
| 2006/0080656 A1 * | 4/2006 | Cain | G06F 8/65 717/174 |
| 2008/0010233 A1 * | 1/2008 | Sack | G06F 21/6227 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0217382 A1 * | 8/2009 | Lecheler | H04L 63/1416 726/26 |
| 2010/0250497 A1 * | 9/2010 | Redlich | F41H 13/00 707/661 |
| 2011/0093701 A1 * | 4/2011 | Etchegoyen | G06F 21/121 713/165 |
| 2012/0233137 A1 | 9/2012 | Jakobson et al. |
| 2013/0086688 A1 * | 4/2013 | Patel | G06F 21/53 726/25 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0108652 A1 * | 4/2014 | Richard | G06F 11/3003 709/224 |
| 2014/0137257 A1 * | 5/2014 | Martinez | H04L 63/1433 726/25 |
| 2014/0359537 A1 | 12/2014 | Jakobson et al. |
| 2015/0007050 A1 | 1/2015 | Jakobson et al. |
| 2015/0040232 A1 * | 2/2015 | Oliphant | G06F 21/554 726/25 |
| 2015/0095162 A1 | 4/2015 | Jakobson et al. |
| 2015/0172321 A1 * | 6/2015 | Kirti | H04L 63/20 726/1 |
| 2015/0172563 A1 | 6/2015 | Jakobson et al. |

(56) References Cited

U.S. PATENT DOCUMENTS

2015/0180894 A1\* 6/2015 Sadovsky ............ G06F 3/0481
       726/22
2018/0131728 A1\* 5/2018 Purushothaman .... H04L 63/205

\* cited by examiner

APPLICATION SECURITY ASSESSMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A client-server model is a computing model which divides tasks between the providers of a resource or service, called servers, and resource or service requesters, called clients. Clients and servers communicate over a computer network. A server is a host computer that runs server programs which share their resources or services with clients. Such a server program may be referred to as an application program, or application for short, which can be a computer program designed to perform a set of coordinated functions, tasks, or activities for the benefit of the user who requests service or resources through a client. An application contrasts with system software, which is mainly involved with running a computer. Clients initiate communication sessions with servers which await incoming requests. Functions such as email exchange, web access, and database access are typically built on the client-server model.

During the setup of an application, an administrator or developer may have to configure many different security settings for their application. Enterprises that provide servers which host applications may provide detailed documentation, training, and education to ensure that application administrators and/or developers stay up to date with how to use and configure security settings. However, application administrators and/or developers may not fully understand what to implement as security requirements because security threats keep constantly changing. Consequently, an administrator or developer may pay a security expert to periodically conduct a security audit for the administrator's or developer's application. The security expert may make security recommendations based on the security audit, and the administrator or developer may attempt to implement these security recommendations.

The worst case scenario is for the application or the website to be hacked and the contents leaked to unauthorized users. The security expert can provide a throughout assessment providing detailed recommendations for implementation changes. These recommendations can include a better use of cryptographic functions and modules that are not vulnerable to simple attacks, a secure data sharing model, additional authentication for different user roles and profiles within the application or the website, proper authorization, and an audit trail model, to name a few.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Methods and mechanisms for application security assessment will be described with reference to example embodiments. The following detailed description will first describe a method for application security assessment. Next, an example screen shot, an example logic flow, and example system components for application security assessment are described.

In accordance with embodiments described herein, there are provided systems and methods for application security assessment. A first security configuration and a second security configuration associated with an application are identified. A security score is calculated based on a comparison of the first security configuration to a first baseline security setting and a comparison of the second security configuration to a second baseline security setting. A security report associated with the application is generated wherein the security report includes the security score. The system outputs the security report including the security score.

For example, the system identifies multiple security configurations for a web application, including a security configuration requiring passwords to be 5 characters long. The system calculates the security score for the web application by comparing each identified security configuration to a corresponding baseline security setting, such as comparing the security configuration requiring passwords to be 5 characters long to a baseline security setting that requires passwords to be 8 characters long. The system outputs the security report for the web application to an administrator's user device. This security report includes the security score of 75% compliance, which is partially based on the high security risk due to the configuration requiring passwords to be only 5 characters long, instead of 8 characters long. The system enables administrators and/or developers to better understand their security posture to ensure secure implementation of their applications.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
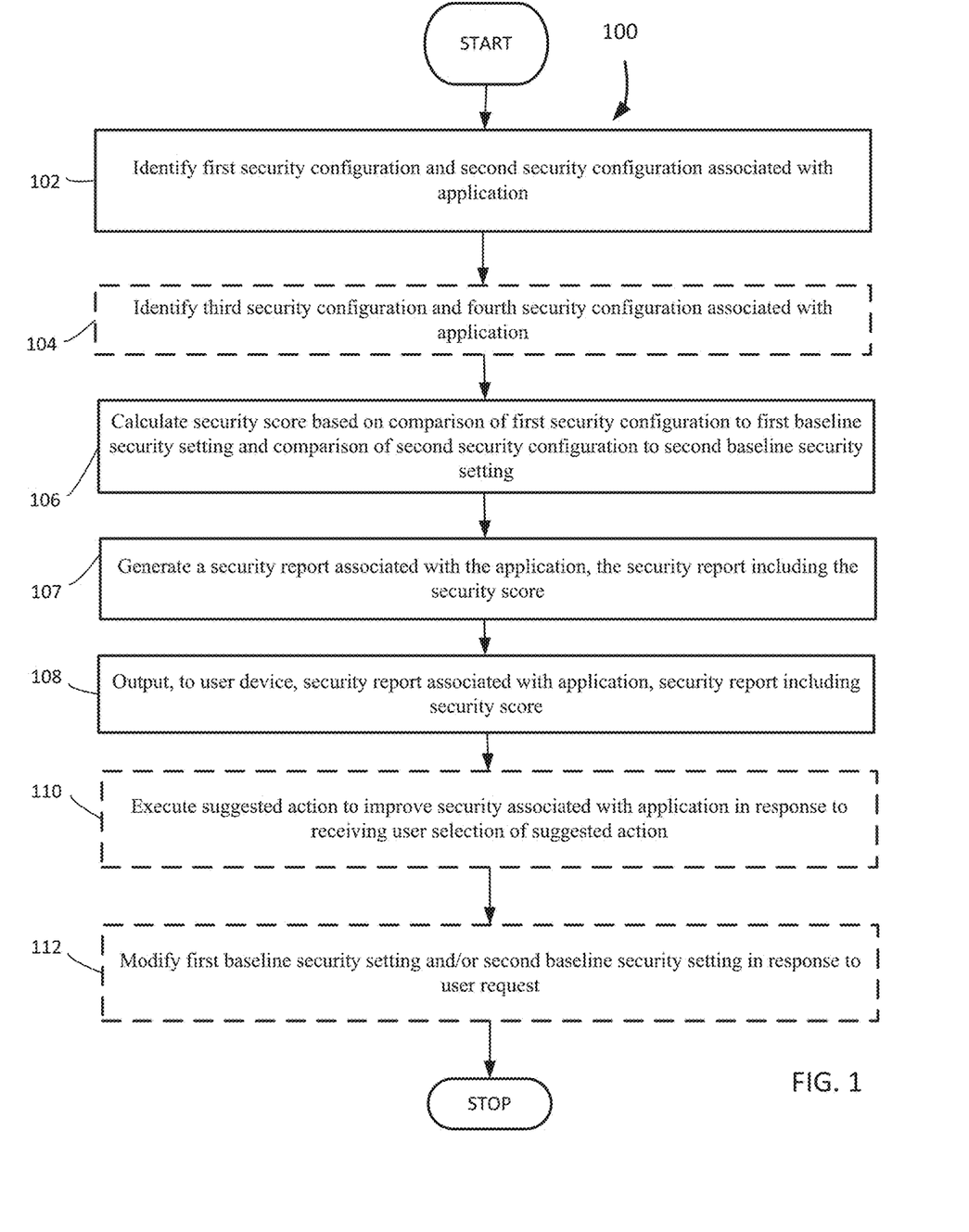
FIG. 1 is an operational flow diagram illustrating a high level overview of a method for application security assessment, in an embodiment.
Figure 2:
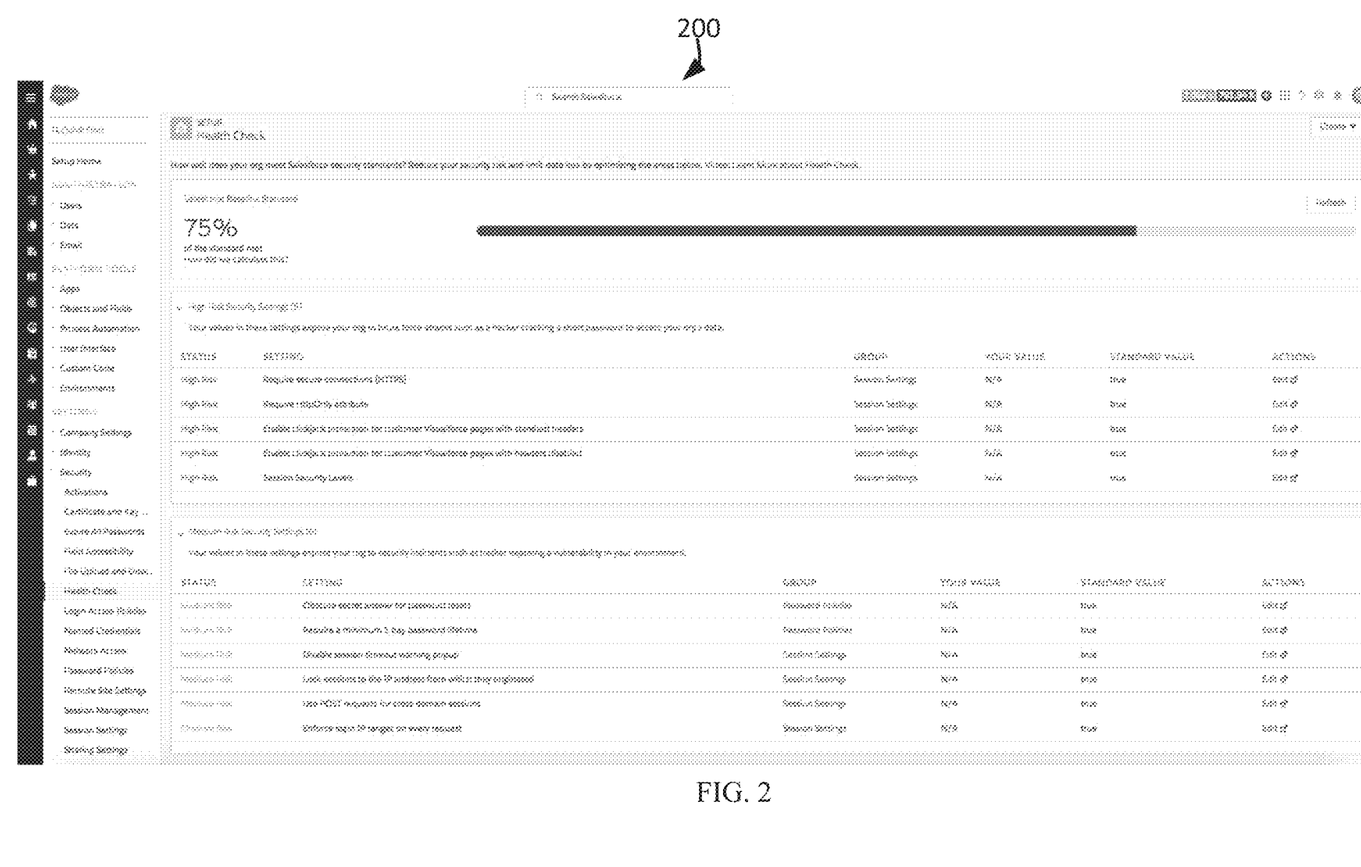
FIG. 2 is a screen shot illustrating a frame of an example user interface screen of a display device for application security assessment, in an embodiment.

FIG. 1 is an operational flow diagram illustrating a high level overview of a method 100 for application security assessment. The example of a screen shot which is mentioned below in reference to FIG. 1 is depicted in FIG. 2 and described below in reference to FIG. 2.

A first security configuration and a second security configuration associated with an application are identified, block 102. The system identifies an application's security configurations that will be the basis for the application's security assessment. For example and without limitation, this can include the system identifying multiple security configurations for a web application, including a security configuration requiring passwords to be 5 characters long. Other examples of security options for passwords include the options for degrees of password complexity, such as requiring the creation of passwords with special characters, and the option for whether a user can submit a previously expired password as a required new password. A security configuration can be the arrangement or set-up of the software in a computer system to be safe from threats, a security option can be a thing that may be chosen to be safe from threats, and a security setting can be an optional adjustment of a computer so that it performs a particular operation to be safe from threats. For example, one security option for passwords is password complexity, and an application administrator can select from any of 5 different security settings that correspond to 5 different levels of password complexity, such that when the system implements the administrator's selected 1 of the 5 security settings, the selected security setting becomes the security configuration for password complexity.

Having identified some security configurations, a third security configuration and a fourth security configuration associated with an application are optionally identified, block 104. The system can base the application's security assessment on additionally identified security configurations. By way of example and without limitation, this can include the system identifying additional security configurations for the web application, including a group of security configurations for sessions and a group of security configurations for keys and certificates.

After security configurations are identified, a security score is calculated based on a comparison of the first security configuration to a first baseline security setting and a comparison of the second security configuration to a second baseline security setting, block 106. The system calculates a security score that reflects the compliance between the application's security configurations and the baseline of corresponding recommended security settings. In embodiments, this can include the system calculating the security score for the web application by comparing each identified security configuration to a corresponding baseline security setting, such as comparing the security configuration requiring passwords to be 5 characters long to a baseline security setting requiring passwords to be 8 characters long. The security score may be based on a corresponding weight associated with each comparison of a security configuration to a baseline security. For example, the system can calculate the security score based on assigning more weight to the high risk configuration requiring passwords to be only 5 characters long than to the medium risk configuration requiring renewal of digital certificates every 2 years. A baseline security setting can be an optional adjustment of a computer so that it performs a particular operation to be safe from threats. A comparison can be an estimate or measure of the similarity or dissimilarity between things. A security score can be a rating or grade of safety from threats.

Once the security score is calculated, a security report that includes the security score and that is associated with the application is generated, block 107. The security report associated with the application is then output, block 108. The system's security assessment of the application is output in the form of a security report and may be outputted to a user device. For example and without limitation, this can include the system outputting the security report for the web application that includes the security score of 75% compliance, as depicted in FIG. 2, to an administrator's user device. A security score could be partially based on the high security risk due to the configuration requiring passwords to be only 5 characters long.

The system enables administrators and/or developers to better understand their security posture to ensure secure implementation of their applications. The security report may associate at least one security configuration with a risk level. For example, the security report identifies medium risk security configurations and high risk security configurations, which include the configuration requiring passwords to be only 5 characters long. The security report may include a recommended action to improve security associated with the application. For example, the security report may include a recommendation to change the configuration requiring passwords to be only 5 characters long to a configuration requiring passwords to be 8 characters long, based on the best practice specified in the baseline security settings. A security report can be an account given of safety from threats, especially in the form of a document, after investigation or consideration.

Having output a security report that may include a recommended action, the recommended action to improve security associated with the application is optionally executed in response to receiving a user selection of the recommended action, block 110. The system can execute actions that the security report recommended for the administrator or developer to take to improve the application's security. By way of example and without limitation, this can include the system responding to the administrator's selection of a "fix it" button displayed near a recommended action by changing the high risk configuration requiring passwords to be only 5 characters long to the baseline-recommended configuration requiring passwords to be 8 characters long. In another example, the system responds to the administrator's selection of a "fix it" button displayed near a recommended action by changing the high risk configuration requiring passwords to be only 5 characters long to user-selected configuration requiring passwords to be 6 characters long, instead of the baseline-recommended configuration requiring passwords to be 8 characters long. The administrator can instruct the system to implement some recommended actions by selecting their corresponding "fix it" buttons, which does not implement other recommended actions corresponding to un-selected "fix it" buttons, or the administrator can instruct the system to implement all recommended actions by selecting a global "fix it" button. A recommended action can be advised behavior that is suitable for a particular purpose.

After outputting a security report based on comparisons of security configurations to baseline security settings, a first baseline security setting and/or a second baseline security setting are optionally modified in response to a user request, block 112. The system enables an administrator or developer to select another baseline of security settings or create a custom baseline of security settings. In embodiments, this can include the system responding to an administrator's request by modifying the baseline security setting that causes passwords to expire every 12 months to a custom baseline security setting that causes passwords to expire every 6 months. In another example, the system responds to an administrator's request by modifying the standard baseline security settings to a baseline security setting based on the requirements of The Health Insurance Portability and Accountability Act of 1996 (HIPAA). In yet another example, the system responds to an administrator's first request by modifying the standard baseline security settings to the HIPAA baseline security setting, and then the system responds the administrator's second request by modifying the HIPAA baseline security setting that causes passwords to expire every 12 months to a custom baseline security setting that causes passwords to expire every 6 months. Another example of a baseline security settings is settings based on financial services standards, such as the Payment Card Industry Data Security Standard. A user request can be a person who operates a computer asking the computer for something.

The method 100 may be repeated as desired. Although this disclosure describes the blocks 102-112 executing in a particular order, the blocks 102-112 may be executed in a different order. In other implementations, each of the blocks 102-112 may also be executed in combination with other blocks and/or some blocks may be divided into a different set of blocks.

FIG. 2 is a screen shot illustrating a frame 200 of an example user interface screen of a display device for application security assessment, under an embodiment. The frame 200 can be part of the user interface that an administrator or developer operates to view their security report and security score, take action, and perform any tasks. The user interface provides automated assessment of the security implementation of the application and stacks ranked results into high risk, medium risk, and meet standard categories based on different implementation levels, and provides an overall score, such as 75% compliant, for the application. The frame 200 depicts that the system compared all security configurations to their corresponding baseline security settings to identify 5 high risk security configurations in the session settings group, 2 medium risk security configurations in the password policies group, and 4 medium risk security configurations in the session settings group. However, the system can identify any number of any type of risk security configuration for any combination of groups of security configurations. The system can identify any number of groups of security configurations, such as a group of password security configurations, a group of keys and certificates security configurations, a group of session security configurations, a group of sharing model security configurations, and a group of login access security configurations. Each individual security option within a group of security configurations can be set to any number of security settings. For each identified high or medium risk, the frame 200 can depict the group, the security configuration value, the baseline security setting's standard value, and a button to request the system take action to bring the identified security configuration into compliance with the baseline security setting. Administrators and/or developers can improve their security score by requesting the system to take such actions on the various configurations depicted in the frame 200.

The frame 200 may be part of a larger display screen that includes fields for users to enter commands to create, retrieve, edit, and store records. The database system may output a display screen that includes the frame 200 in response to searches based on search criteria input via a user interface. Because the frame 200 is an example, the frame 200 could vary greatly in appearance. For example, the relative sizes and positioning of the text is not important to the practice of the present disclosure. The frame 200 can be depicted by any visual display, but are preferably depicted by a computer screen. The frame 200 could also be output as a report and printed or saved in electronic format, such as PDF. The frame 200 can be part of a personal computer system and/or a network, and operated from system data received by the network, and/or on the Internet. The frame 200 may be navigable by a user.

Typically, a user can employ a touch screen input or a mouse input device to point-and-click to a location on the frame 200 to manage the text on the frame 200, such as a selection that enables a user to edit the text. Alternately, a user can employ directional indicators, or other input devices such as a keyboard. The text depicted by the frame 200 is an example, as the frame 200 may include a much greater amount of text. The frame 200 may also include fields in which a user can input textual information.

Figure 3:
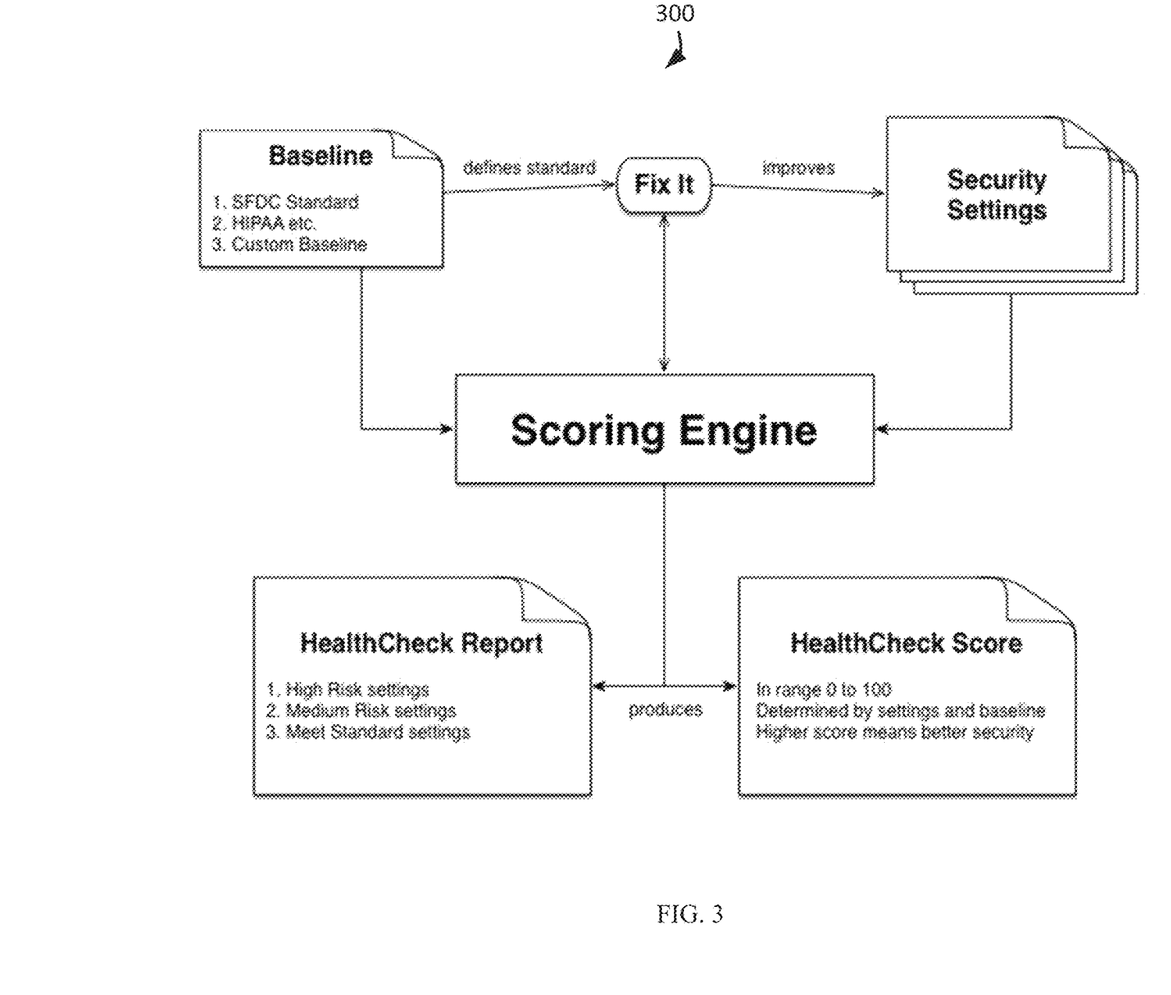
FIG. 3 depicts an example logic flow for application security assessment, in an embodiment.

FIG. 3 depicts an example logic flow 300 for application security assessment, under an embodiment. The scoring engine is a built in and automated security evaluator. The scoring engine inputs an application's security settings' configurations and the corresponding baseline security settings, compares the security configurations and the baseline security settings, and outputs a security health check report and a security health check score. The security health check report can specify which security configurations are high risk, which security configurations are medium risk, and which security configurations meet the standard security settings. The security health score can be in the range of 0 to 100, where a higher score indicates better security.

Figure 4:
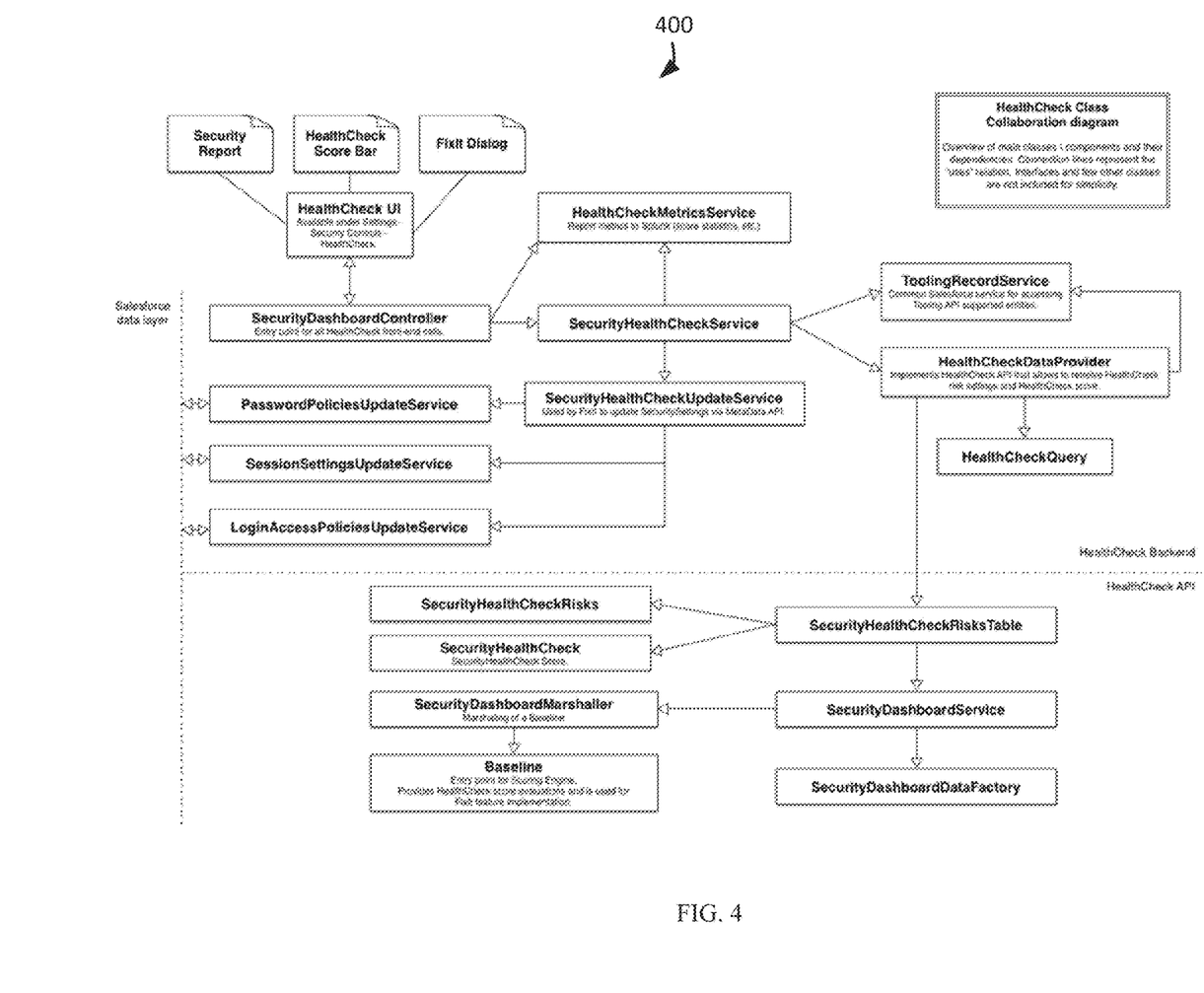
FIG. 4 depicts example system components for application security assessment, in an embodiment.

FIG. 4 depicts example components 400 for application security assessment, under an embodiment. The Security Report lists security settings, their values, recommended values, and compliance state. A user can fix the setting manually by clicking "Edit" or setting a group name link. The Health Check Score Bar displays the Health Check score in the range from 0 to 100. The maximum score is assigned if all settings are in compliance with the selected baseline. The Fix It Dialog gives a user a selection of settings which are in high and medium risk state, and sends requests to fix the settings, selected by user to a Security Dashboard Controller. The Security Dashboard Controller is exposed to the Health Check user interface components, is an entry point for Security Health Check page user interface components' requests, and is responsible for interacting between various services/models. The Health Check Metrics Service reports health check metrics, such as the health check score. The Security Health Check Service is responsible for retrieving and updating data as requested by the Security Dashboard Controller. This data includes the health check score, custom baselines, security setting values, and their evaluations. The Security Health Check Update Service is responsible for updating security settings as requested by a user via fix it dialog. The values will be set according to the baseline selected by the user. The baseline can be a standard or custom baseline created by an administrator. The Password Policies Update Service is responsible for updating Password Policies security settings, such as password complexity, minimal password length, maximum invalid login attempts, etc. The Session Settings Update Service is responsible for updating Session Settings security settings, such as requires HTTPS secure connections, forces logout on session timeout, locks sessions to the internet protocol address from which they originated, etc.

The Login Access Policies Update Service is responsible for updating Login Access Policies security settings, such as administrators can log in as any user, etc. The Tooling Record Service accesses Tooling Application Programming Interface-supported entities, and accepts a Health Check Query to perform read and update operations. The Health Check Data Provider implements a Health Check Application Programming Interface that allows retrieval of Health Check risk settings and the Health Check score. The Health Check Query provides queries that are accessible to the Health Check Data Provider. These queries can be used to get and update all security settings supported by the Security Health Check. The Security Health Check Risks Table is a system catalog table which exposes Health Check security settings, and fetches the data (such as security settings values, recommended settings, Health Check score, etc.) from the Security Dashboard service. The Security Dashboard Service is responsible for providing data as requested by the Security Dashboard Controller. The Security Dashboard Data Factory instantiates instances of the Security Dashboard Settings Group, and delegates loading of the requested setting group data to a corresponding implementation class, such as Password Policies Setting Group, Session Settings Group, etc. The Security Health Check Risks represents security settings data in scope of the security health check tool, and contains information about a single setting, its current value, and recommended value as specified in the baseline selected by a user. The Security Health Check represents Health Check data in scope of the security health check tool, and contains a custom baseline identifier and the Health Check score. The Security Dashboard Marshaller is a parser that converts XML baseline documents to a Baseline object that can be used for security settings evaluation and calculation of the Security Health Check score. The Baseline object represents parsed baseline XML documents, is part of the Scoring Engine which evaluates security settings against the provided baseline, gives recommendations which settings are in medium or high risk state, and is responsible for calculating the Security Health Check score.

System Overview

Figure 5:
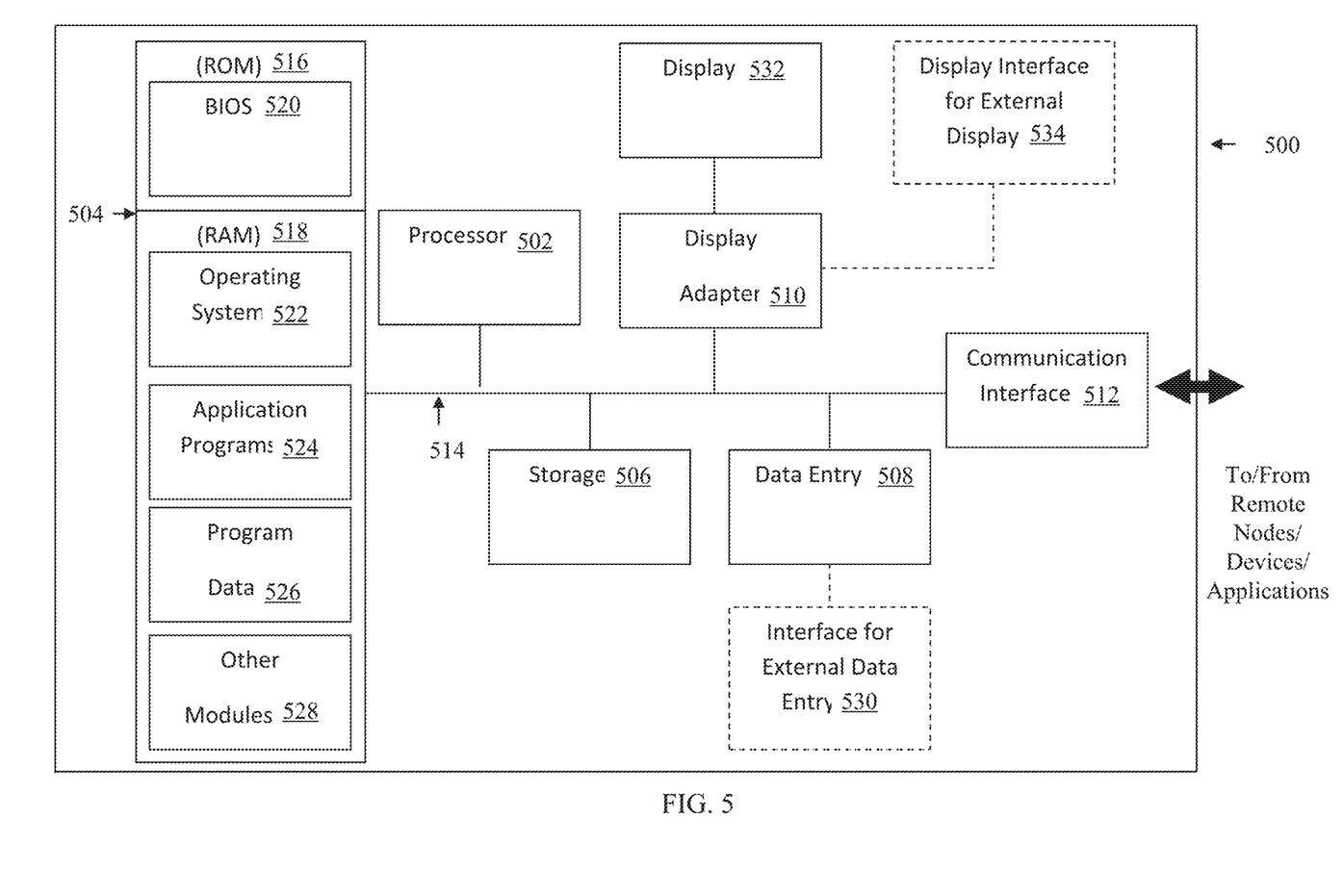
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for application security assessment, the system comprising:
   one or more processors; and
   a non-transitory computer readable medium storing a plurality of instructions, which when executed, cause the one or more processors to:
   identify a first security configuration and a second security configuration associated with an application executing on a computing system;
   compare the first security configuration to a first baseline security setting and the second security configuration to a second baseline security setting to determine measurements of compliance between the respective security configurations and the corresponding baseline security settings, the first baseline security setting and the second baseline security setting being recommended security settings associated with the corresponding security configurations of the application;

determine a security score representing the overall compliance between the first and second security configurations and their corresponding baseline security settings;

cause a security report associated with the application to be generated, the security report including the security score; and cause the security report to be outputted.

2. The system of claim 1, comprising further instructions, which when executed, cause the one or more processors to identify a third security configuration and a fourth security configuration associated with the application, the first security configuration and the second security configuration associated with a first security setting group, the third security configuration and the fourth security configuration associated with a second security setting group, wherein determining the security score is further based on a comparison of the third security configuration to a third baseline security setting and a comparison of the fourth security configuration to a fourth baseline security setting.

3. The system of claim 1, wherein determining the security score is further based on a first weight associated with the comparison of the first security configuration to the first baseline security setting and a second weight associated with the comparison of the second security configuration to the second baseline security setting.

4. The system of claim 1, wherein the security report associates at least one security configuration with a risk level.

5. The system of claim 1, wherein the security report further comprises a recommended action to improve security associated with the application.

6. The system of claim 5, comprising further instructions, which when executed, cause the one or more processors to execute the recommended action to improve the security associated with the application in response to receiving a user selection of the recommended action.

7. The system of claim 1, comprising further instructions, which when executed, cause the one or more processors to modify at least one of the first baseline security setting and the second baseline security setting in response to a user request.

8. A computer program product comprising computer-readable program code to be executed by one or more processors when retrieved from a non-transitory computer-readable medium, the program code including instructions to:

identify a first security configuration and a second security configuration associated with an application executing on a computing system;

compare the first security configuration to a first baseline security setting and the second security configuration to a second baseline security setting to determine measurements of compliance between the respective security configurations and the corresponding baseline security settings, the first baseline security setting and the second baseline security setting being recommended security settings associated with the corresponding security configurations of the application;

determine a security score representing the overall compliance between the first and second security configurations and their corresponding baseline security settings;

cause a security report associated with the application to be generated, the security report including the security score; and cause the security report to be outputted.

9. The computer program product of claim 8, wherein the program code comprises further instructions to identify a third security configuration and a fourth security configuration associated with the application, the first security configuration and the second security configuration associated with a first security setting group, the third security configuration and the fourth security configuration associated with a second security setting group, wherein determining the security score is further based on a comparison of the third security configuration to a third baseline security setting and a comparison of the fourth security configuration to a fourth baseline security setting.

10. The computer program product of claim 8, wherein determining the security score is further based on a first weight associated with the comparison of the first security configuration to the first baseline security setting and a second weight associated with the comparison of the second security configuration to the second baseline security setting.

11. The computer program product of claim 8, wherein the security report associates at least one security configuration with a risk level.

12. The computer program product of claim 8, wherein the security report further comprises a recommended action to improve security associated with the application.

13. The computer program product of claim 12, wherein the program code comprises further instructions to execute the recommended action to improve the security associated with the application in response to receiving a user selection of the recommended action.

14. The computer program product of claim 8, wherein the program code comprises further instructions to modify at least one of the first baseline security setting and the second baseline security setting in response to a user request.

15. A method comprising:

identifying, by a computing system, a first security configuration and a second security configuration associated with an application executing on a computing system;

comparing the first security configuration to a first baseline security setting and the second security configuration to a second baseline security setting to determine measurements of compliance between the respective security configurations and the corresponding baseline security settings, the first baseline security setting and the second baseline security setting being recommended security settings associated with the corresponding security configurations of the application;

determining a security score representing the overall compliance between the first and second security configurations and their corresponding baseline security settings;

causing a security report associated with the application to be generated, the security report including the security score; and causing the security report to be outputted.

16. The method of claim 15, wherein the method further comprises identifying a third security configuration and a fourth security configuration associated with the application, the first security configuration and the second security configuration associated with a first security setting group, the third security configuration and the fourth security configuration associated with a second security setting group, wherein determining the security score is further based on a comparison of the third security configuration to a third baseline security setting and a comparison of the fourth security configuration to a fourth baseline security setting, and a first weight associated with the comparison of the first security configuration to the first baseline security setting and a second weight associated with the comparison of the second security configuration to the second baseline security setting.

17. The method of claim 15, wherein the security report associates at least one security configuration with a risk level.

18. The method of claim 15, wherein the security report further comprises a recommended action to improve security associated with the application.

19. The method of claim 18, wherein the method further comprises executing the recommended action to improve the security associated with the application in response to receiving a user selection of the recommended action.

20. The method of claim 15, wherein the method further comprises modifying at least one of the first baseline security setting and the second baseline security setting in response to a user request.

* * * * *